US008468610B2

(12) United States Patent
Beals et al.

(10) Patent No.: US 8,468,610 B2
(45) Date of Patent: Jun. 18, 2013

(54) DETERMINING FRAUDULENT USE OF ELECTRONIC DEVICES UTILIZING MATRIX CODES

(75) Inventors: William Michael Beals, Englewood, CO (US); Charlie William Zetterower, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 231 days.

(21) Appl. No.: 13/015,382

(22) Filed: Jan. 27, 2011

(65) Prior Publication Data

US 2012/0198572 A1 Aug. 2, 2012

(51) Int. Cl.
*G06F 21/00* (2006.01)
(52) U.S. Cl.
USPC .......................................................... 726/34
(58) Field of Classification Search
None
See application file for complete search history.

(56) References Cited

U.S. PATENT DOCUMENTS

| | | | |
|---|---|---|---|
| 4,809,325 A | 2/1989 | Hayashi et al. | |
| 4,837,414 A | 6/1989 | Edamula | |
| 5,510,603 A | 4/1996 | Hess et al. | |
| 5,581,636 A | 12/1996 | Skinger | |
| 5,602,377 A | 2/1997 | Beller et al. | |
| 5,703,349 A | 12/1997 | Meyerson et al. | |
| 5,959,285 A | 9/1999 | Schuessler | |
| 5,978,855 A | 11/1999 | Metz et al. | |
| 6,006,990 A | 12/1999 | Ye et al. | |
| 6,058,238 A | 5/2000 | Ng | |
| 6,325,287 B1 * | 12/2001 | Nakajima et al. | 235/462.1 |
| 6,512,919 B2 | 1/2003 | Ogasawara | |
| 6,556,273 B1 | 4/2003 | Wheeler et al. | |
| 6,983,304 B2 * | 1/2006 | Sato | 709/203 |
| 7,206,029 B2 | 4/2007 | Cohen-Solal | |
| 7,206,409 B2 | 4/2007 | Antonellis et al. | |
| 7,221,405 B2 | 5/2007 | Basson et al. | |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

International Search Report and Written Opinion of PCT/US11/59977 mailed on Mar. 19, 2012, 7 pages.

(Continued)

*Primary Examiner* — Gilberto Barron, Jr.
*Assistant Examiner* — Virginia T Ho
(74) *Attorney, Agent, or Firm* — Kilpatrick Townsend & Stockton LLP

(57) ABSTRACT

In one or more implementations, a computing device may receive information from a matrix code reader that scans multiple matrix codes, each displayed by one of multiple devices. The computing device may determine whether or not the devices are being fraudulently utilized, such as whether the devices are in the same location. Additionally, in some implementations, a computing device may receive a service request from a matrix code reader that includes an associated telephone number. The computing device may extract the number and may handle the service request based on the number. Moreover, in various implementations, a computing device may receive information from a matrix code reader that scans a displayed matrix code. The information may include an electronic signature that is included in the matrix code by the device. After receiving the information, the computing device may analyze the information to determine that the electronic signature is valid.

15 Claims, 12 Drawing Sheets

U.S. PATENT DOCUMENTS

| | | |
|---|---|---|
| 7,328,848 B2 | 2/2008 | Xia et al. |
| 7,369,180 B2 | 5/2008 | Xing |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 2001/0037297 A1 | 11/2001 | McNair |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0044532 A1 | 3/2004 | Karstens |
| 2005/0011958 A1 | 1/2005 | Fukasawa et al. |
| 2005/0015800 A1 | 1/2005 | Holcomb |
| 2005/0055281 A1 | 3/2005 | Williams |
| 2005/0125301 A1 | 6/2005 | Muni |
| 2005/0262548 A1 | 11/2005 | Shimojo et al. |
| 2005/0264694 A1 | 12/2005 | Ilan et al. |
| 2006/0079247 A1 | 4/2006 | Ritter |
| 2006/0086796 A1 | 4/2006 | Onogi |
| 2006/0124742 A1 | 6/2006 | Rines et al. |
| 2006/0196950 A1 | 9/2006 | Kiliccote |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0092154 A1 | 4/2008 | Hogyoku |
| 2008/0112615 A1* | 5/2008 | Obrea et al. ................ 382/169 |
| 2008/0156879 A1 | 7/2008 | Melick et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2009/0029725 A1 | 1/2009 | Kindberg |
| 2009/0031071 A1 | 1/2009 | Chiu |
| 2009/0031373 A1 | 1/2009 | Hogyoku |
| 2009/0083808 A1 | 3/2009 | Morrison |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0327060 A1 | 12/2010 | Moran et al. |
| 2011/0039573 A1 | 2/2011 | Hardie |
| 2011/0065451 A1 | 3/2011 | Danado et al. |
| 2011/0192895 A1* | 8/2011 | Millan Marco ................ 235/375 |
| 2011/0208710 A1 | 8/2011 | Lesavich |
| 2011/0264527 A1 | 10/2011 | Fitzpatrick et al. |
| 2011/0282727 A1 | 11/2011 | Phan et al. |
| 2011/0314485 A1 | 12/2011 | Abed |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1* | 6/2012 | Bracalente et al. ........... 235/375 |
| 2012/0155838 A1 | 6/2012 | Gerhards et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |

| | | | |
|---|---|---|---|
| GB | 2 165 129 A | 4/1986 |
| GB | 2 325 765 A | 12/1998 |
| GB | 2 471 567 A | 1/2011 |
| JP | 2007-213548 A | 8/2007 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2011/009055 A2 | 1/2011 |
| WO | 01/58146 A2 | 8/2011 |

OTHER PUBLICATIONS

International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
"Android App Reviews & Showcase Just a Tapp Away," Android Tapp, 10 pp. Found online at http://www.androidtapp.com/download-the-weather-channel-android-app-from-your-tv/, Oct. 22, 2010.
"Fox TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.
"Fox's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local-QR Barcode Technology, 2 pp. Found online at http://www.searchmagnetlocal.com/qr_barcode_technology.html, Oct. 22, 2010.
Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.
Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.
Smith, Lindsay, "Barcodes Make History on Global TV", 3 pp. Found online at http://www.lindsaysmith.com/worlds-first-mobio-mini-telethon/, Oct. 22, 2010.
Nghee, Seah Y. , "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.
Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.
Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.
Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.
U.S. Appl. No. 12/953,227, filed Nov. 23, 2010, Michael T. Dugan et al., Pending.
U.S. Appl. No. 12/953,273, filed Nov. 23, 2010, Dan J. Minnick et al., Pending.
U.S. Appl. No. 12/958,073, filed Dec. 1, 2010, William Michael Beals et al., Pending.
U.S. Appl. No. 12/960,285, filed Dec. 3, 2010, Jason Gaede, et al., Pending.
U.S. Appl. No. 12/961,369, filed Dec. 6, 2010, Mark H. Gomez, Pending.
U.S. Appl. No. 12/964,478, filed Dec. 9, 2010, William Michael Beals, Pending.
U.S. Appl. No. 12/965,645, filed Dec. 10, 2010, Kranti Kilaru et al., Pending.
U.S. Appl. No. 12/971,349, filed Dec. 17, 2010, Mark H. Gomez et al., Pending.
U.S. Appl. No. 12/973,431, filed Dec. 20, 2010, Keith Gerhards et al., Pending.
U.S. Appl. No. 12/981,244, filed Dec. 29, 2010, Steven M. Casagrande et al., Pending.
U.S. Appl. No. 12/984,385, filed Jan. 4, 2011, Max S. Gratton, Pending.
U.S. Appl. No. 12/986,721, filed Jan. 7, 2011, Mark H. Gomez et al., Pending.
U.S. Appl. No. 13/006,270, filed Jan. 13, 2011, William Michael Beals et al., Pending.
U.S. Appl. No. 13/007,317, filed Jan. 14, 2011, Max S. Gratton et al., Pending.
U.S. Appl. No. 13/010,557, filed Jan. 20, 2011, William Michael Beals et al., Pending.
U.S. Appl. No. 13/014,591, filed Jan. 26, 2011, John T. Kennedy, Pending.
U.S. Appl. No. 13/016,483, filed Jan. 28, 2011, Mark H. Gomez et al., Pending.
U.S. Appl. No. 13/020,678, filed Feb. 3, 2011, Dan J. Minnick et al., Pending.
U.S. Appl. No. 13/028,030, filed Feb. 15, 2011, Steven M. Casagrande et al., Pending.
U.S. Appl. No. 13/031,115, filed Feb. 18, 2011, Jason Anguiano, Pending.

U.S. Appl. No. 13/035,525, filed Feb. 25, 2011, Germar Schaefer et al., Pending.
U.S. Appl. No. 13/037,302, filed Feb. 28, 2011, Germar Schaefer et al., Pending.
U.S. Appl. No. 13/034,482, filed Feb. 24, 2011, Germar Schaefer, Pending.
U.S. Appl. No. 13/037,312, filed Feb. 28, 2011, Max S. Gratton et al., Pending.
U.S. Appl. No. 13/037,316, filed Feb. 28, 2011, Henry Gregg Martch et al., Pending.
U.S. Appl. No. 13/037,333, filed Feb. 28, 2011, Jason Gaede et al., Pending.
Byford, D., "Universal Interactive Device," International Business Machines Corporation, Jun. 1998, 1 page.
International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
"Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
Extended European Search Report for EP 12152690.9 dated Jun. 19, 2012, 9 pages.
International Search Report and Written Opinion of PCT/US2012/026624 mailed Aug. 29, 2012, 14 pages.
U.S. Appl. No. 12/958,073, filed Dec. 1, 2010, Office Action mailed Aug. 31, 2012, 12 pages.
U.S. Appl. No. 12/961,369, filed Dec. 6, 2010, Final Rejection mailed Oct. 30, 2012, 17 pages.
U.S. Appl. No. 12/971,349, filed Dec. 7, 2010, Final Rejection mailed Oct. 24, 2012, 11 pages.
U.S. Appl. No. 12/953,227, filed Nov. 23, 2010, Office Action mailed Nov. 7, 2012, 31 pages.
U.S. Appl. No. 13/016,483, filed Jan. 28, 2011, Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 12/960,285, filed Dec. 3, 2010, Final Office Action mailed Dec. 6, 2012, 17 pages.
U.S. Appl. No. 12/984,385, filed Jan. 4, 2011, Notice of Allowance mailed Nov. 28, 2012, 11 pages.
U.S. Appl. No. 13/037,312, filed Feb. 28, 2011, Office Action mailed Aug. 15, 2012, 9 pages.

* cited by examiner

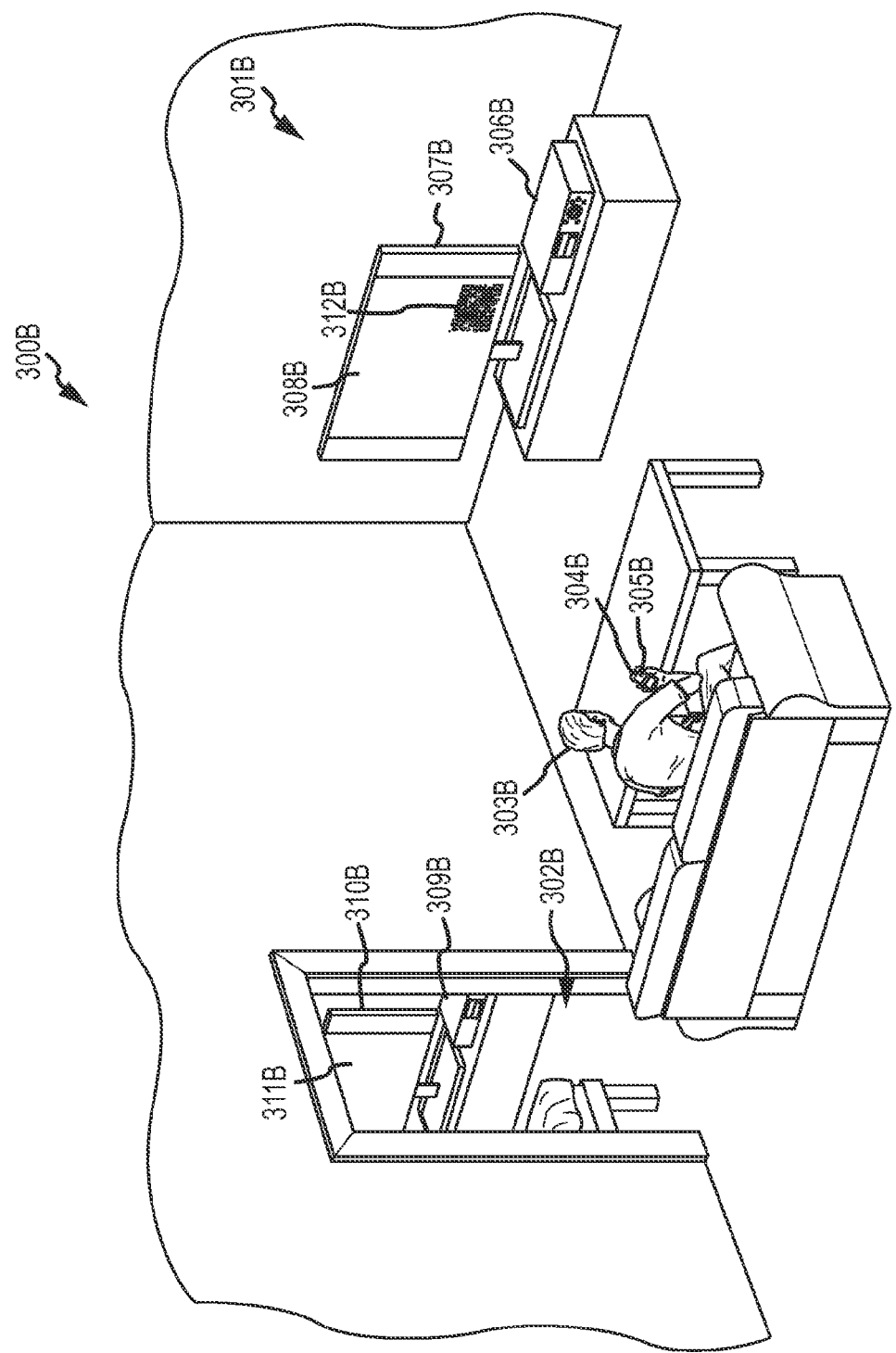

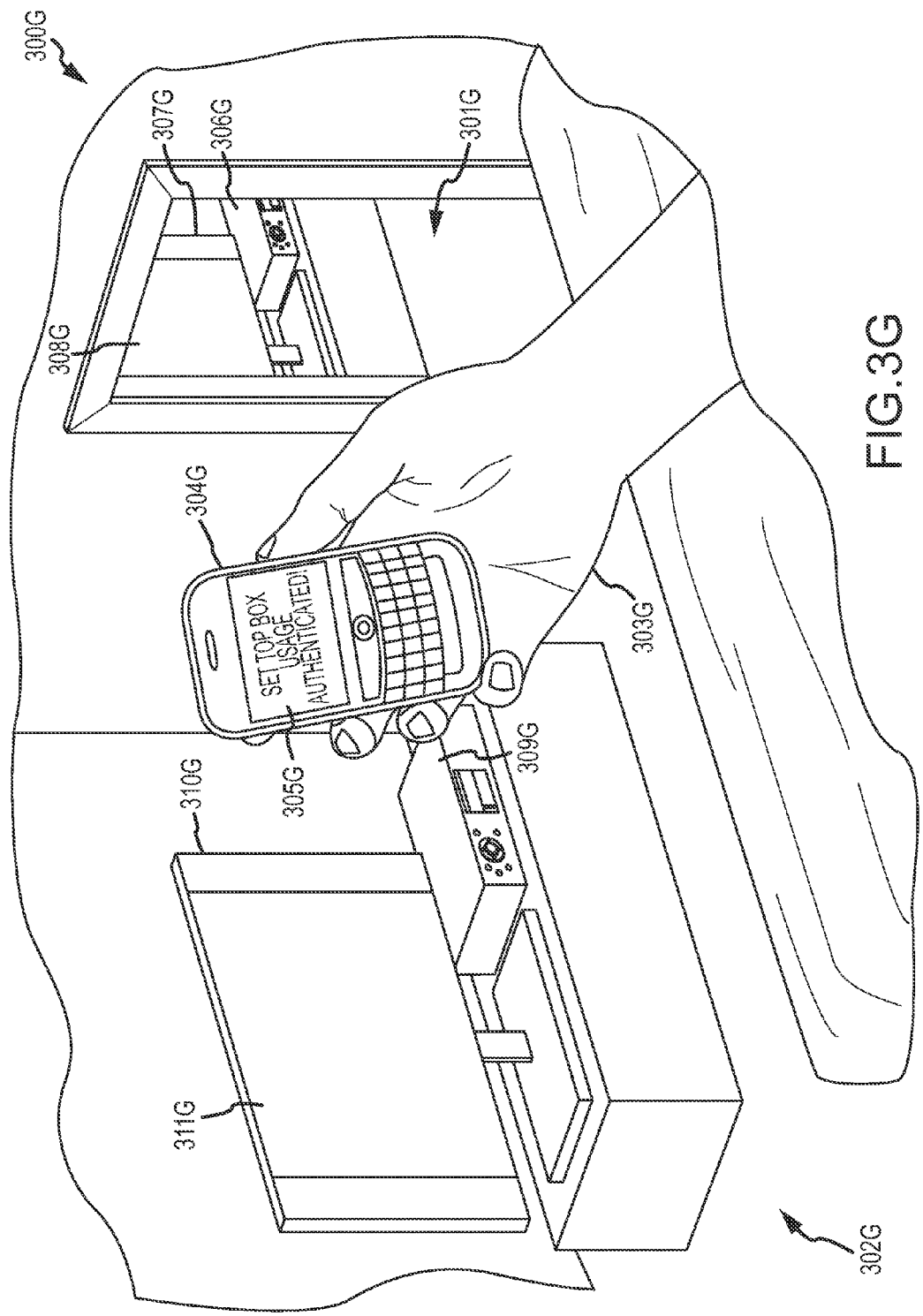

DETERMINING FRAUDULENT USE OF ELECTRONIC DEVICES UTILIZING MATRIX CODES

FIELD OF THE INVENTION

This disclosure relates generally to electronic devices, and more specifically to utilizing matrix codes to determine whether or not use of electronic devices is fraudulent.

SUMMARY

The present disclosure discloses systems and methods for determining fraudulent use of electronic devices utilizing matrix codes. A computing device may receive information from one or more matrix code readers. The information may be received from the matrix code reader in response to the matrix code reader scanning multiple matrix codes each separately displayed by one of multiple electronic devices. The computing device may analyze the information and determine whether or not the electronic devices are being fraudulently utilized. In various implementations, the computing device may determine that the electronic devices are not being fraudulently utilized if the computing device is able to determine that the electronic devices are being utilized in the same location. To evaluate whether the electronic devices are being utilized in the same location, the computing device may analyze a variety of different factors.

Additionally, the present disclosure discloses systems and methods for processing service requests utilizing matrix codes. A computing device may receive a service request (such as a service request to order on demand content, a service request to order one or more products, and so on) from one or more matrix code readers which the matrix code readers submitted in response to capturing one or more matrix codes. The matrix code reader may include one or more telephone numbers associated with the matrix code reader in the service request. The computing device may extract the telephone number from the service request and may handle the service request based at least on the extracted telephone number (such as by performing actions requested by the service request if the telephone number matches telephone numbers associated with an account maintained by the computing device, retrieving customer location information that the computing device requires to complete actions requested by the service request utilizing the telephone number, and so on).

Moreover, the present disclosure discloses systems and methods for validating matrix codes. A computing device may receive information from a matrix code reader. The information may be received from the matrix code reader in response to the matrix code reader scanning a matrix code displayed by an electronic device. The information may include an electronic signature that is included in the matrix code by the electronic device when generating and/or modifying the matrix code by creating a hash value from data of the matrix code and encrypting the hash value utilizing an encryption key assigned to the electronic device. After receiving the information, the computing device may analyze the information to determine that a valid electronic signature for the electronic device is present.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 3A-3G are diagrams illustrating a user utilizing a system for determining fraudulent use of electronic devices in order to authorize two set top boxes within a home. The system may be the system of FIG. 1.

DETAILED DESCRIPTION OF THE EMBODIMENTS

Figure 1:
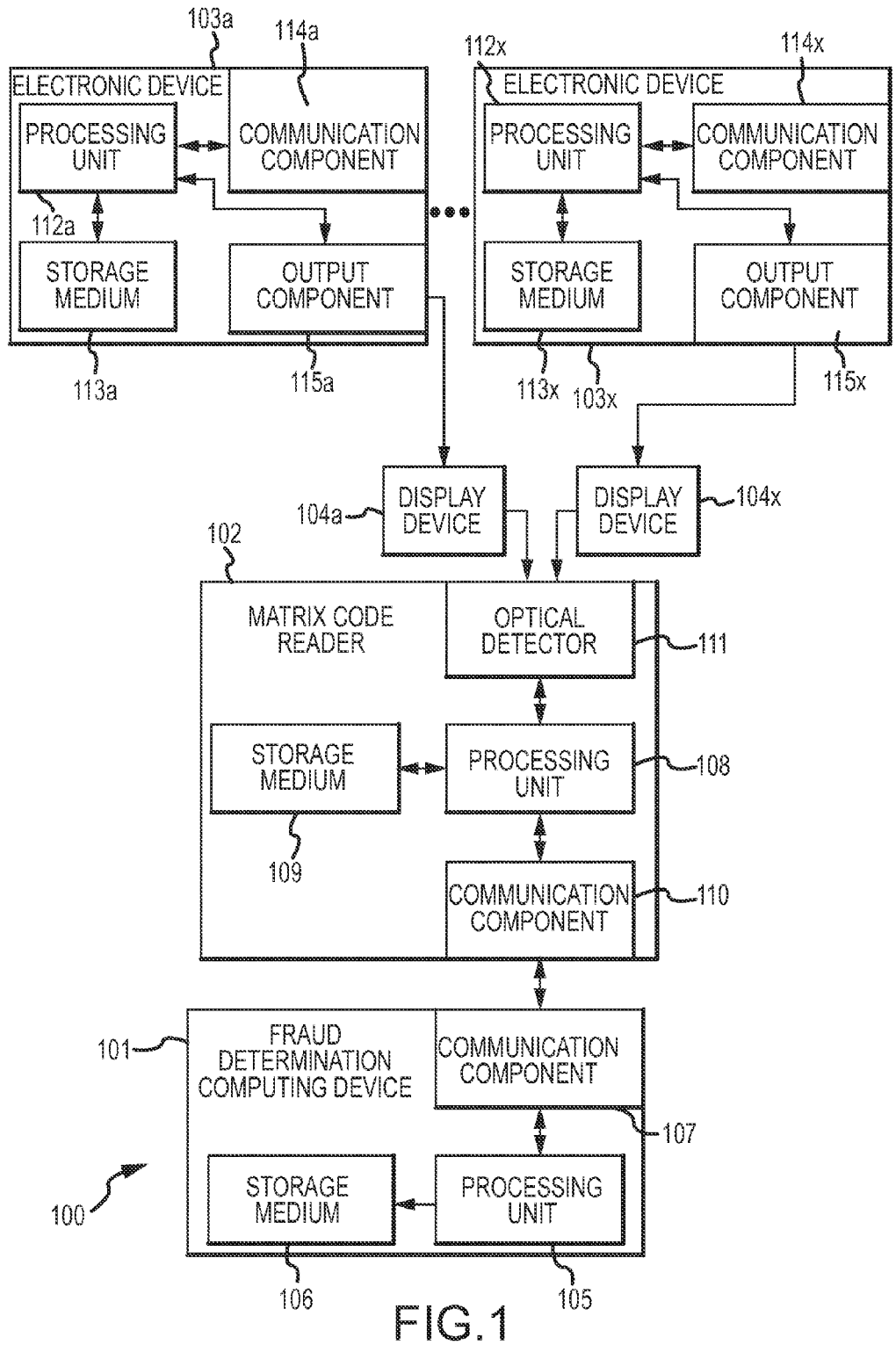
FIG. 1 is a block diagram illustrating a system for determining fraudulent use of electronic devices.

The description that follows includes sample systems, methods, and computer program products that embody various elements of the present disclosure. However, it should be understood that the described disclosure may be practiced in a variety of forms in addition to those described herein.

Electronic devices (such as content receivers, set top boxes, television receivers, digital video recorders, televisions, computers, cellular telephones, electronic kitchen appliances, and so on) are increasingly present in modern life. In many cases, such electronic devices are provided to users under various usage restrictions. For example, a content service provider (such as a cable and/or satellite television programming provider, a video on demand provider, and so on) may provide content receivers (such as television receivers, set top boxes, digital video recorders, and so on) to users as part of the content service. The user may be charged a particular fee for the first content receiver and then a lesser fee for each additional content receiver that the user chooses to utilize with the content service at a single location (such as a home, an office, and so on).

However, some users may attempt to utilize additional content receivers at additional locations other than the location where the first content receiver is utilized. This situation is sometimes referred to as "account packing." Essentially, by attempting to utilize the multiple content receivers at multiple locations instead of at one location, users may be attempting to fraudulently utilize the content receivers with one content service account instead of paying for multiple content service accounts (one for each location).

To prevent fraudulent use of such electronic devices, such as account packing, providers of such devices and/or services may utilize various techniques to confirm that the electronic devices are not being used fraudulently. Such confirmation may be required before the electronic devices can be utilized for their intended purpose, one or more times after the electronic devices are being utilized for their intended purpose, and so on. For example, where a user is utilizing multiple content receivers with a content service, the content service provider may occasionally require the user to execute a verification process where the electronic devices each output a verification code that a user must relay to a telephone verification service. If the user is able to relay all of the applicable verification codes to the telephone verification service in the same telephone call within a set time limit, the content service provider may determine that the content receivers are not being fraudulently utilized and may authorize initiation and/or continuation of the content service to the content receivers. This process may be burdensome and time consuming for users who are attempting to legitimately utilize multiple content receivers as such verification codes may include a large number of digits that the users must read aloud to caller, enter via a telephone keypad or other input device, and so on.

The present disclosure discloses systems and methods for determining fraudulent use of electronic devices utilizing matrix codes (such as QR codes). A computing device may receive information from one or more matrix code readers (such as smart phones, cell phones, bar code scanners, and so on) that the matrix code readers obtained by scanning multiple matrix codes. Each of the multiple matrix codes may have been separately displayed by one of multiple electronic devices. The computing device may analyze the information and determine whether or not the electronic devices are being fraudulently utilized. The computing device may determine that the electronic devices are not being fraudulently utilized if the computing device is able to determine that the electronic devices are being utilized in the same location.

To evaluate whether the electronic devices are being utilized in the same location, the computing device may analyze a variety of different factors. These factors may include: whether or not time stamps included in each of the matrix codes are older than a particular time threshold, whether or not differences between time stamps included in each of the matrix codes exceed a particular time threshold, whether or not the matrix codes were captured more than a particular threshold of time before the computing device received the information, whether or not each matrix code includes a correct electronic signature for the respective electronic device, whether or not telephone numbers included in the information by the matrix code reader that scanned the respective matrix code all match, whether or not a telephone number added by the matrix code reader that scanned the matrix codes is associated with an account corresponding to the electronic devices, and so on.

Further, the present disclosure discloses systems and methods for processing service requests utilizing matrix codes (such as QR codes). A computing device may receive a service request from one or more matrix code readers (such as smart phones, tablet computers, and so on). The matrix code reader may submit the service request in response to capturing one or more matrix codes and may include one or more telephone numbers associated with the matrix code reader in the service request. The computing device may extract the telephone number from the service request and may handle the service request based at least on the extracted telephone number. In some implementations, the computing device may perform actions requested by the service request if the telephone number matches telephone numbers associated with an account maintained by the computing device. In other implementations, the computing device may utilize the telephone number to retrieve customer location information (such as a street address, a network address, and so on) that the computing device requires to complete actions requested by the service request (such as sending content, products, and so on).

Additionally, the present disclosure discloses systems and methods for validating matrix codes. A computing device may receive information from a matrix code reader (such as a smart phone, a cell phone, a bar code scanner, and so on) that the matrix code reader obtained by scanning a matrix code. The matrix code may have been displayed by an electronic device. The information may include an electronic signature that is included in the matrix code by the electronic device when generating and/or modifying the matrix code. To create the electronic signature, the electronic device may create a hash value from data of the matrix code. The electronic device may then encrypt the hash value utilizing an encryption key assigned to the electronic device in order to create the electronic signature. After receiving the information, the computing device may analyze the information to determine that a valid electronic signature for the electronic device is present. If the valid electronic signature is present, the computing device may validate the matrix code.

FIG. 1 is a block diagram illustrating a system 100 for determining fraudulent use of electronic devices. The system 100 includes a fraud determination computing device 101, a matrix code reader 102, a number of electronic devices 103a-103x, and a number of display devices 104a-104x. The fraud determination computing device may be any kind of computing device such as one or more server computers, one or more desktop computers, multiple computing devices arranged in a cloud computing configuration, and so on. The electronic devices may be any kind of electronic devices such as content receivers, set top boxes, television receivers, digital video recorders, televisions, computers, cellular telephones, electronic kitchen appliances, and so on. The matrix code reader may be any kind of device that can capture matrix codes such as one or more smart phones, cell phones, bar code scanners, and so on. The display devices may be any kind of display devices such as cathode ray tube displays, liquid crystal displays, televisions, computer monitors, and so on. Further, although the system is illustrated and described such that each electronic device is communicably connected to a dedicated display device, in various implementations multiple electronic devices may be communicably connected to a shared display device.

The electronic devices 103a-103x may each include one or more processing units electronic devices 112a-112x, one or more non-transitory storage media 113a-113x (which may take the form of, but is not limited to, a magnetic storage medium; optical storage medium; magneto-optical storage medium; read only memory; random access memory; erasable programmable memory; flash memory; and so on), one or more communication components 114a-114x, and one or more output components 115a-115x. The processing unit may execute instructions stored in the non-transitory storage medium to transmit output to the display device 104a-104x, which may then display the output. The output may include one or more matrix codes (such as one or more QR codes). The processing unit may execute instructions stored in the non-transitory storage medium to autonomously generate such matrix codes or obtain information to create such matrix codes via the communication component (such as from the fraud determination computing device 101 which may be part of a content provider system and may be communicably connected to the communication component), obtain such matrix codes by modifying one or more matrix codes received via the communication component, and so on. The processing unit may output such matrix codes in response to user input received via one or more input components of the electronic devices (not shown), instructions received from the fraud determination computing device (which may be communicably connected to the electronic devices), and so on. The processing unit may include a variety of information in such matrix codes such as one or more time stamps, electronic signatures (which the processing unit may generate by generating a hash value from data included in a matrix code and encrypting the hash value with an encryption key of the electronic device stored in the non-transitory storage medium), and so on. Although the electronic devices and display devices are illustrated and described as separate devices, in various implementations the display devices may each be integrated components of the respective associated electronic device without departing from the scope of the present disclosure.

The matrix code reader 102 may include one or more processing units 108, one or more non-transitory storage media 109, one or more communication components 110, and one or more optical detectors 111 (such as one or more still image cameras, video cameras, barcode scanners, and so on). The processing unit may execute instructions stored in the non-transitory storage medium to capture the one or more matrix codes displayed on the display devices 104a-104x (output by the output components 115a-115x) utilizing the optical detector. The processing unit may transmit information from the one or more matrix codes to the fraud determination computing device via the communication component. In some implementations, the processing unit may obtain the information to transmit to the fraud determination computing device by decoding the one or more matrix codes or by transmitting the one or more matrix codes to a backend server (not shown) for decoding. However, in other implementations the processing unit may be configured to transmit the one or more matrix codes to the fraud determination computing device, which may then decode the one or more matrix codes.

In various implementations, the matrix code reader 102 may be associated with one or more telephone numbers. As part of transmitting information from one or more matrix codes to the fraud determination computing device 101, the processing unit 108 may obtain the one or more telephone numbers (such as from the non-transitory storage medium 109) and may include the obtained one or more telephone numbers with the transmitted information.

The fraud determination computing device 101 may include one or more processing units 105, one or more non-transitory storage media 106, and one or more communication components 107. The processing unit may execute instructions stored in the non-transitory storage medium to receive information from one or more matrix codes displayed by the display devices 104a-104x (respectively output by the electronic devices 103a-103x) and scanned by the matrix code reader 102. The processing unit may also analyze the information to determine whether the electronic devices are being fraudulently utilized.

In one or more implementations, the processing unit 105 may analyze the information regarding matrix codes output by the electronic devices 103a-103x and captured from the display devices 104a-104x by the matrix code reader 102 to determine whether or not the electronic devices are being utilized in the same location (such as a home, an office, and so on). A sequence of operations may be triggered (such as by a user, by the fraud determination computing device 101, a content service provider associated with the fraud determination computing device, and so on) whereby the electronic devices each output a matrix code to a respective display device, a user captures the matrix codes utilizing the matrix code reader, the matrix code reader transmits information from the matrix codes to the fraud determination computing device, and the fraud determination computing device determines by analyzing the information whether or not the electronic devices are being utilized in the same location (which may indicate whether users are engaging in fraudulent activities such as account packing).

The processing unit 105 may evaluate a variety of different pieces of information to determine whether or not the electronic devices 103a-103x are being utilized in the same location. By way of a first example, the processing unit may determine whether each of the matrix codes includes a valid electronic signature for the respective electronic device which modified or generated the matrix code. In some implementations, if the electronic signature is generated by the electronic device generating a hash value from data of the matrix code and encrypting the hash value with a private encryption key of a private-public encryption key pair assigned to the electronic device, the processing unit may determine whether an electronic signature is valid by generating the hash value from the data of the matrix code and comparing that hash value to the electronic signature after decrypting the electronic signature utilizing the public encryption key. In other implementations, if the electronic signature is generated by the electronic device generating a hash value from data of the matrix code and encrypting the hash value with a one-way encryption key assigned to the electronic device, the processing unit may determine whether an electronic signature is valid by generating the hash value from the data of the matrix code, and comparing the hash value to the electronic signature after encrypting the hash value with the one-way encryption key. If a matrix code does not include a valid electronic signature for the respective electronic device, the processing unit may determine that the user has scanned forged matrix codes in an attempt to hide the fact that the electronic devices are being utilized in different locations.

By way of a second example, each of the matrix codes may include time stamps indicating when the matrix codes were generated, modified, and so on. As such, the processing unit 105 may compare the time stamps. If time differences between the time stamps exceed a threshold value (such as thirty seconds), the processing unit may determine that the electronic devices 103a-103x are being utilized in different locations. However, if time differences between the time stamps do not exceed a threshold value, the processing unit may determine that the electronic devices are being utilized in the same location.

Further, by way of a third example, the processing unit 105 may evaluate whether the time stamps included in the matrix codes are too old. If more than a threshold amount of time (such as two minutes) has passed since the time stamps were generated, the processing unit may determine that the electronic devices 103a-103x are being utilized in different locations. However, if more than the threshold amount of time has not passed since the time stamps were generated, the processing unit may determine that the electronic devices are being utilized by the same location.

By way of a fourth example, the processing unit 105 may evaluate one or more telephone numbers associated with the matrix code reader 102 that the matrix code reader includes in transmitted information from the matrix codes to see if the telephone number matches one or more account telephone numbers for a user account corresponding to the electronic devices 103a-103x. If the telephone number does not match the account telephone number, the processing unit may determine that the electronic devices are being utilized in different locations. However, if the telephone number matches the account telephone number, the processing unit may determine that the electronic devices are being utilized by the same location.

Further, by way of a fifth example, the processing unit 105 may evaluate whether the one or more telephone numbers associated with the matrix code reader 102 and included in the transmitted information from the matrix codes by the matrix code reader are the same. If the telephone numbers are not the same telephone number, the processing unit may determine that the electronic devices 103a-103x are being utilized in different locations. However, if the telephone numbers are the same, the processing unit may determine that the electronic devices are being utilized by the same location.

Although the various examples described above are described separately, the processing unit 105 may utilize combinations of these various examples in determining whether or not the electronic devices 103a-103x are being utilized in the same location. For example, in one or more implementations, the processing unit may evaluate electronic signature validity, time differences among time stamps, time passage since generation of the time stamps, and matrix code reader telephone numbers in determining whether or not the electronic devices are being utilized in the same location.

Figure 2:
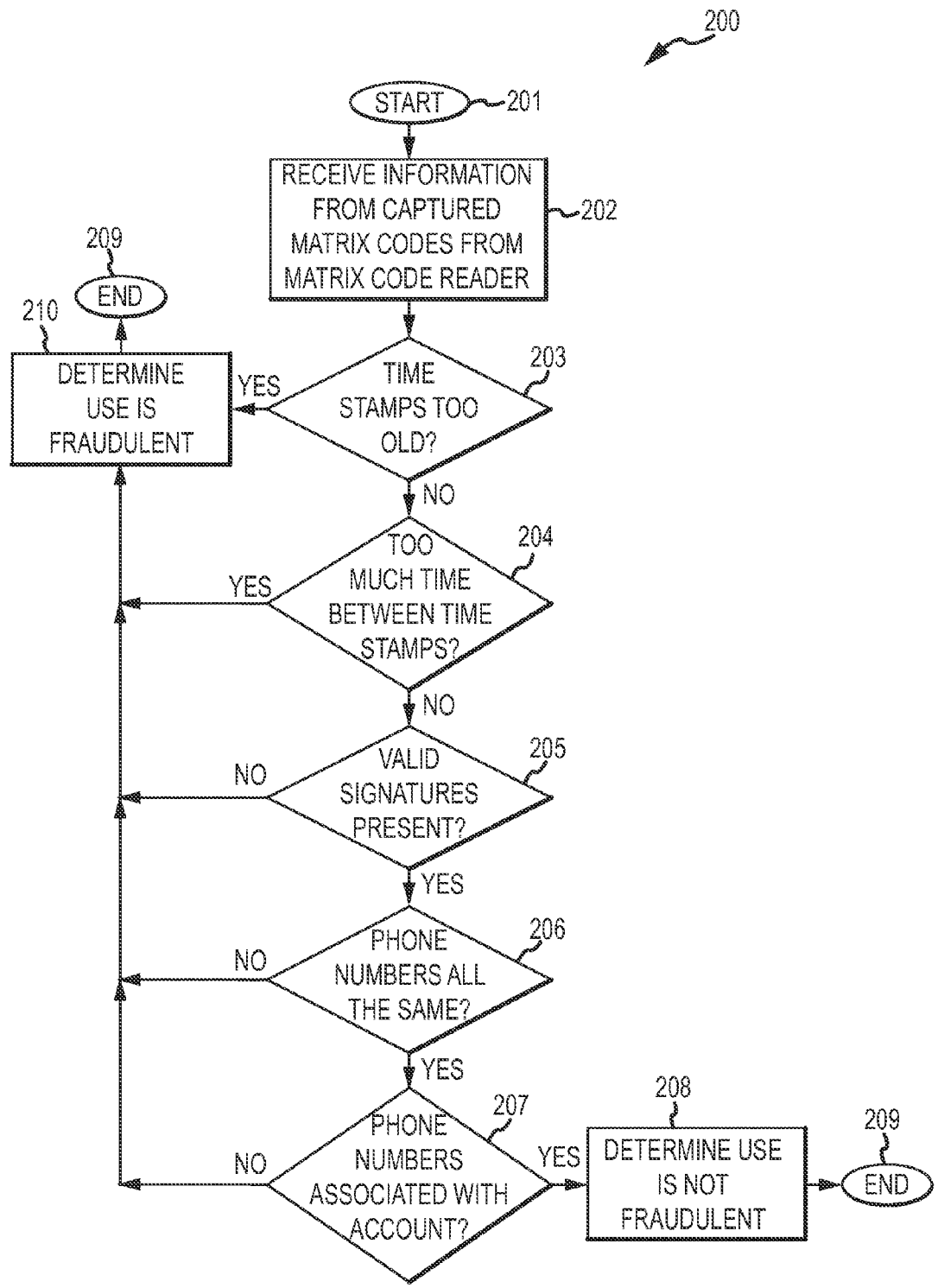
FIG. 2 is a flow chart illustrating a method for determining fraudulent use of electronic device. This method may be performed by the system of FIG. 1.

FIG. 2 illustrates a method 200 for determining fraudulent use of electronic devices. The method 200 may be performed by the fraud determination computing device 101 of FIG. 1. The flow begins at block 201 and proceeds to block 202 where the fraud determination computing device receives information from the matrix code reader 102 regarding matrix codes that the matrix code reader has captured from the display devices 104a-103x (which were output by the electronic devices 103a-103x). The flow then proceeds to block 203 where the fraud determination computing device determines whether or not more than a certain threshold of time has passed (such as five minutes) since time stamps included in the matrix codes were generated. If so, the flow proceeds to block 210 where the fraud determination computing device determines that use of the electronic devices is fraudulent (which may indicate that a user is committing account packing utilizing the electronic devices) before the flow proceeds to block 209 and ends. Otherwise, the flow proceeds to block 204.

At block 204, after the fraud determination computing device 101 determines that more than the certain threshold of time has not passed since the time stamps were generated, the fraud determination computing device determines whether or not time differences between the time stamps exceeds a threshold (such as ten seconds). If so, the flow proceeds to block 210 where the fraud determination computing device determines that use of the electronic devices is fraudulent. Otherwise, the flow proceeds to block 205.

At block 205, after the fraud determination computing device 101 determines that time differences between the time stamps do not exceed the threshold, the fraud determination computing device determines whether or not valid electronic signatures are present for each of the matrix codes. If not, the flow proceeds to block 210 where the fraud determination computing device determines that use of the electronic devices is fraudulent. Otherwise, the flow proceeds to block 206.

At block 206, after the fraud determination computing device 101 determines that valid electronic signatures are present for each of the matrix codes, the fraud determination computing device determines whether or not telephone numbers associated with the matrix code reader 102 and included in the information for each of the matrix codes by the matrix code reader are all the same. If not, the flow proceeds to block 210 where the fraud determination computing device determines that use of the electronic devices is fraudulent. Otherwise, the flow proceeds to block 207.

At block 207, after the fraud determination computing device 101 determines that telephone numbers associated with the matrix code reader 102 in each of the matrix codes are all the same, the fraud determination computing device determines whether or not the telephone numbers match one or more account telephone numbers of one or more user accounts corresponding to the electronic devices 103a-103x. If not, the flow proceeds to block 210 where the fraud determination computing device determines that use of the electronic devices is fraudulent. Otherwise, the flow proceeds to block 208. At block 208, the fraud determination computing device determines that use of the electronic devices is not fraudulent. The flow then proceeds to block 209 and ends.

Figure 3A:
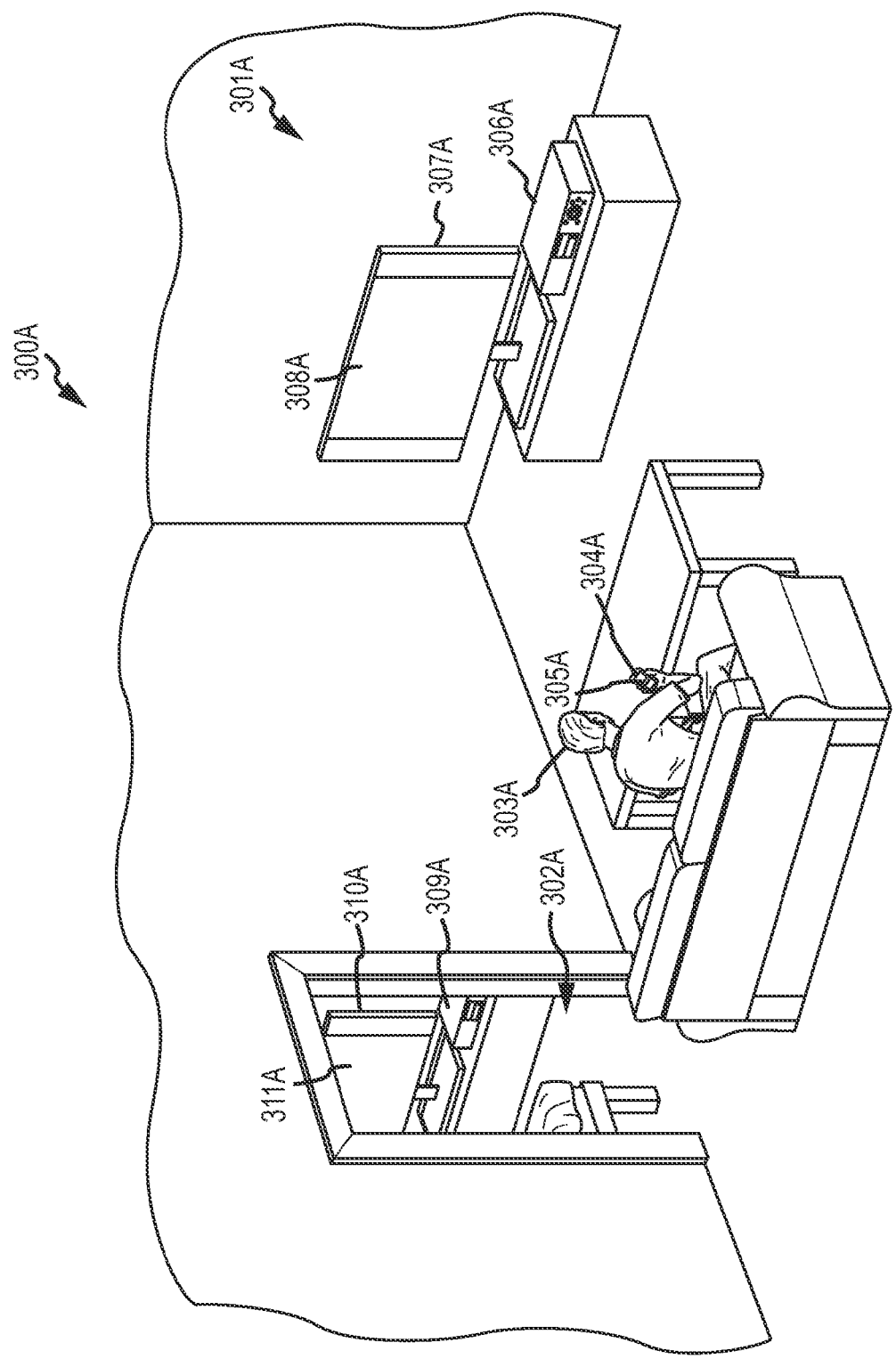

FIGS. 3A-3G illustrate a user 303A-303G utilizing a system 300A-300G for determining fraudulent use of electronic devices in order to authorize two set top boxes 306A-306G and 309A-309G within a home. As illustrated in FIG. 3A, the user 303A has two set top boxes 306A and 309G within his home. One of the set top boxes, set top box 306A, is located in the user's living room 301A and is connected to a living room television 307A. The other of the set top boxes, set top box 309A, is located in the user's bedroom 302A and is connected to a bedroom television 310A. The user may utilize the set top boxes to receive content from a content provider (such as a cable or satellite television provider) (not illustrated). However, before the user can utilize the set top boxes to receive content in this example, the content provider may require the user to authorize the set top boxes so that the content provider can determine that the set top boxes are being utilized in the same location (though in other examples the user may be required to perform the described process and/or similar processes at times other than initial setup). The user may then initiate a process to authorize the set top boxes by selecting an item from a set top box menu, calling the content provider, and so on.

Figure 3C:
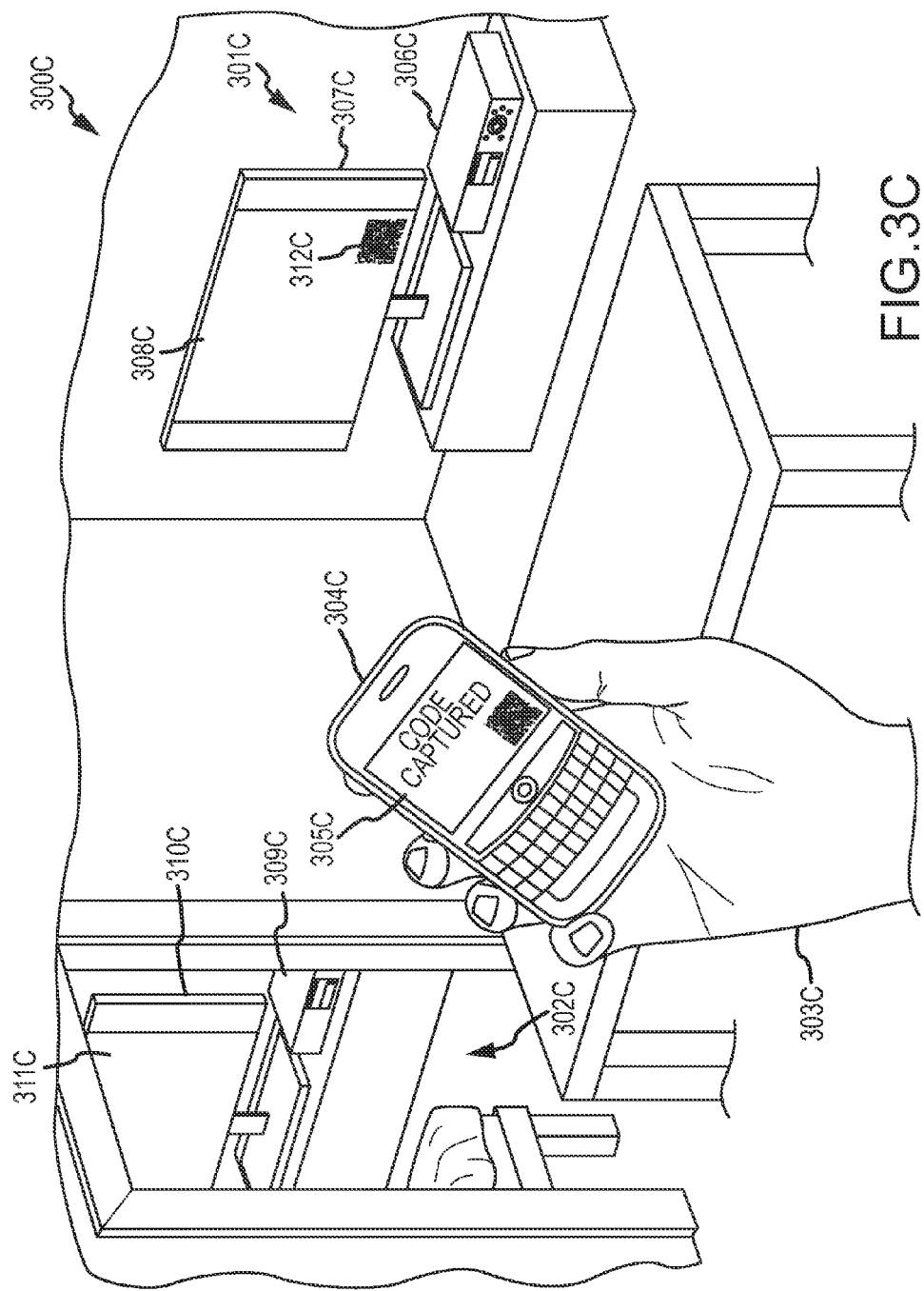

As illustrated in FIG. 3B, in response to initiation of the process to authorize the set top boxes 306B and 309B, the set top box 306B may display a QR code 312B on a screen 308B of the living room television 307B which the user 303B may capture utilizing a smart phone 304B. As illustrated in FIG. 3C, after the user 303C utilizes the smart phone 304C to capture the QR code 312C, the smart phone may display a message on a smart phone screen 305C that the QR code has been captured.

Figure 3D:
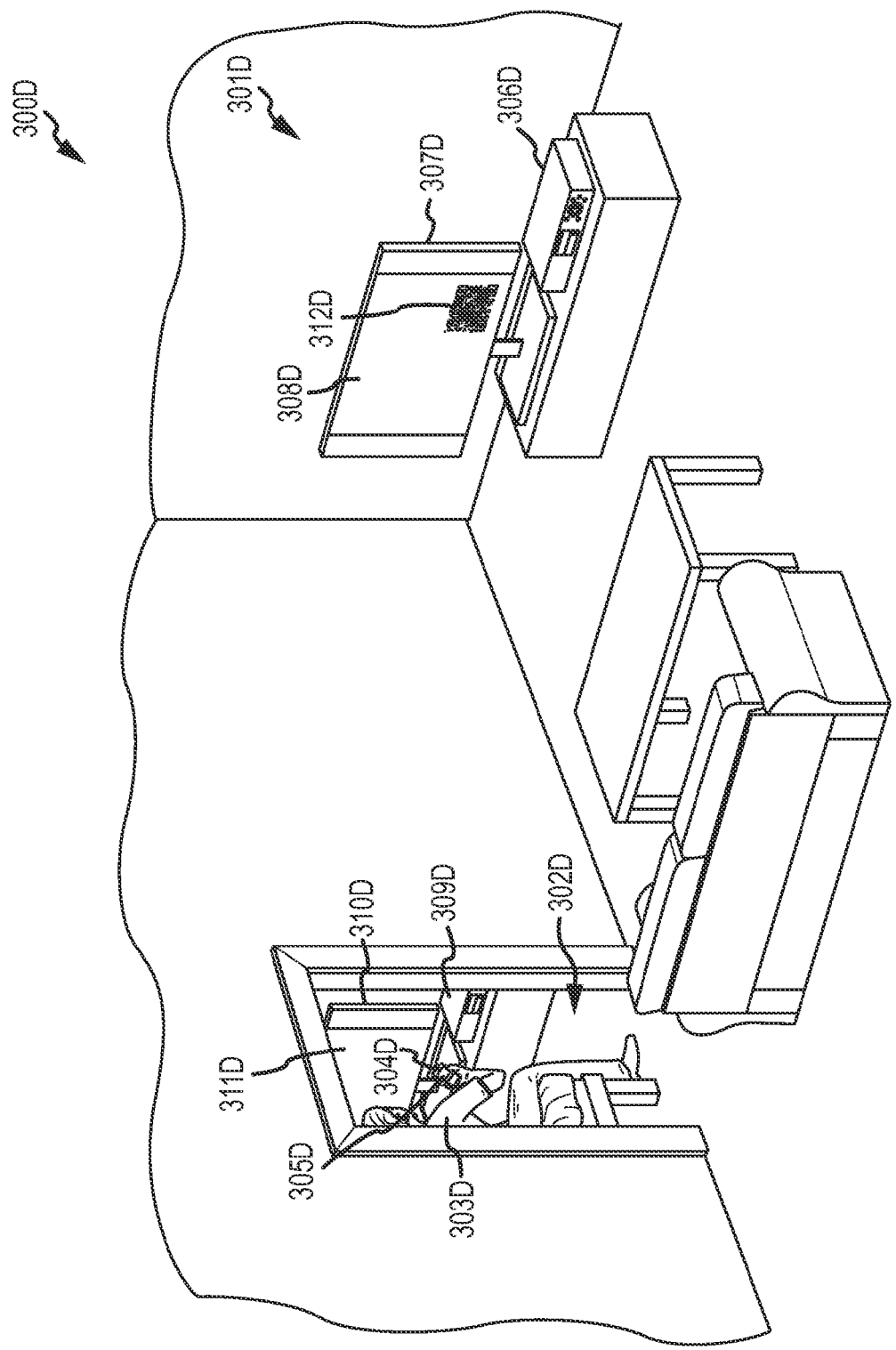
Figure 3E:
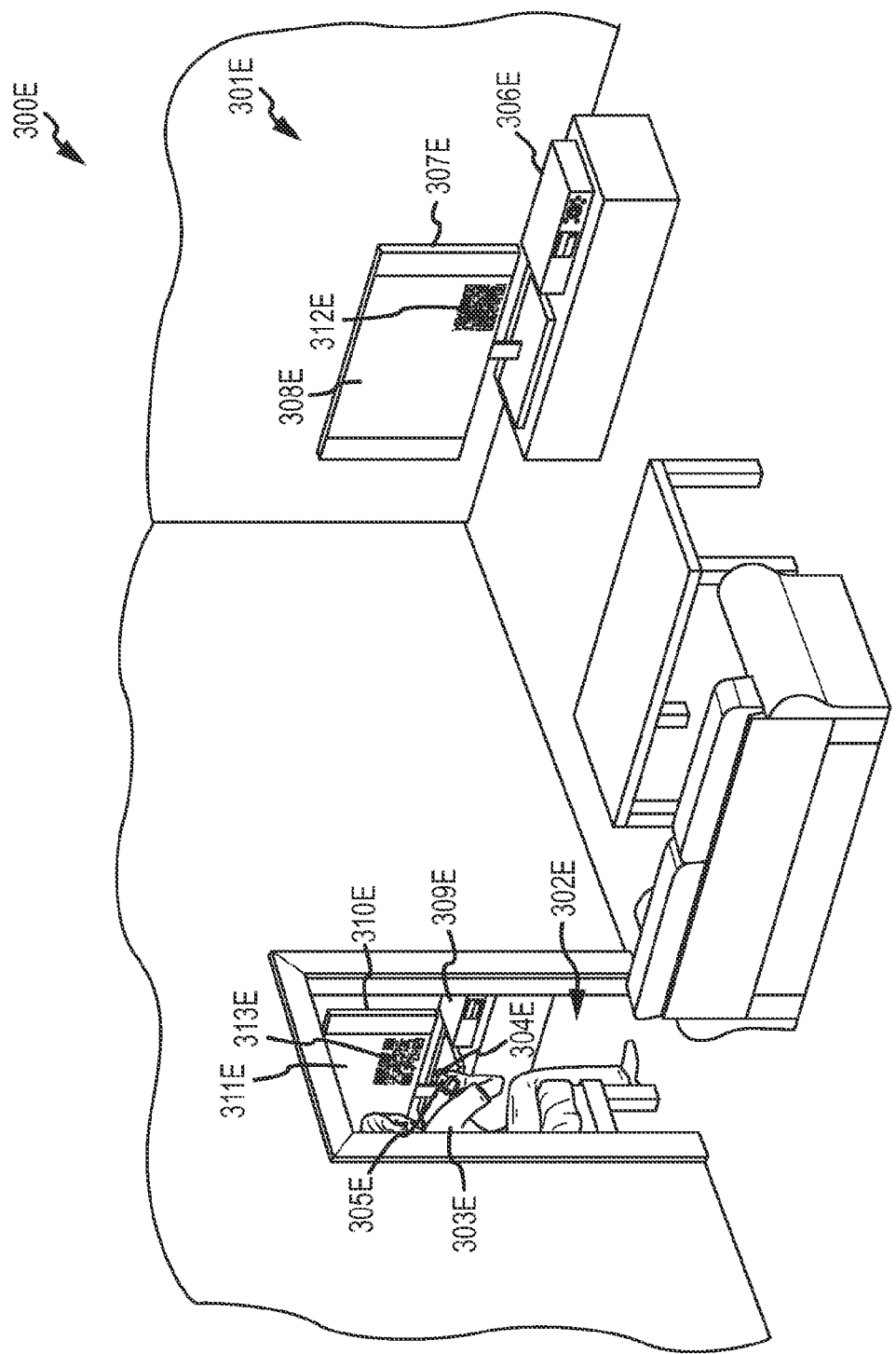
Figure 3F:
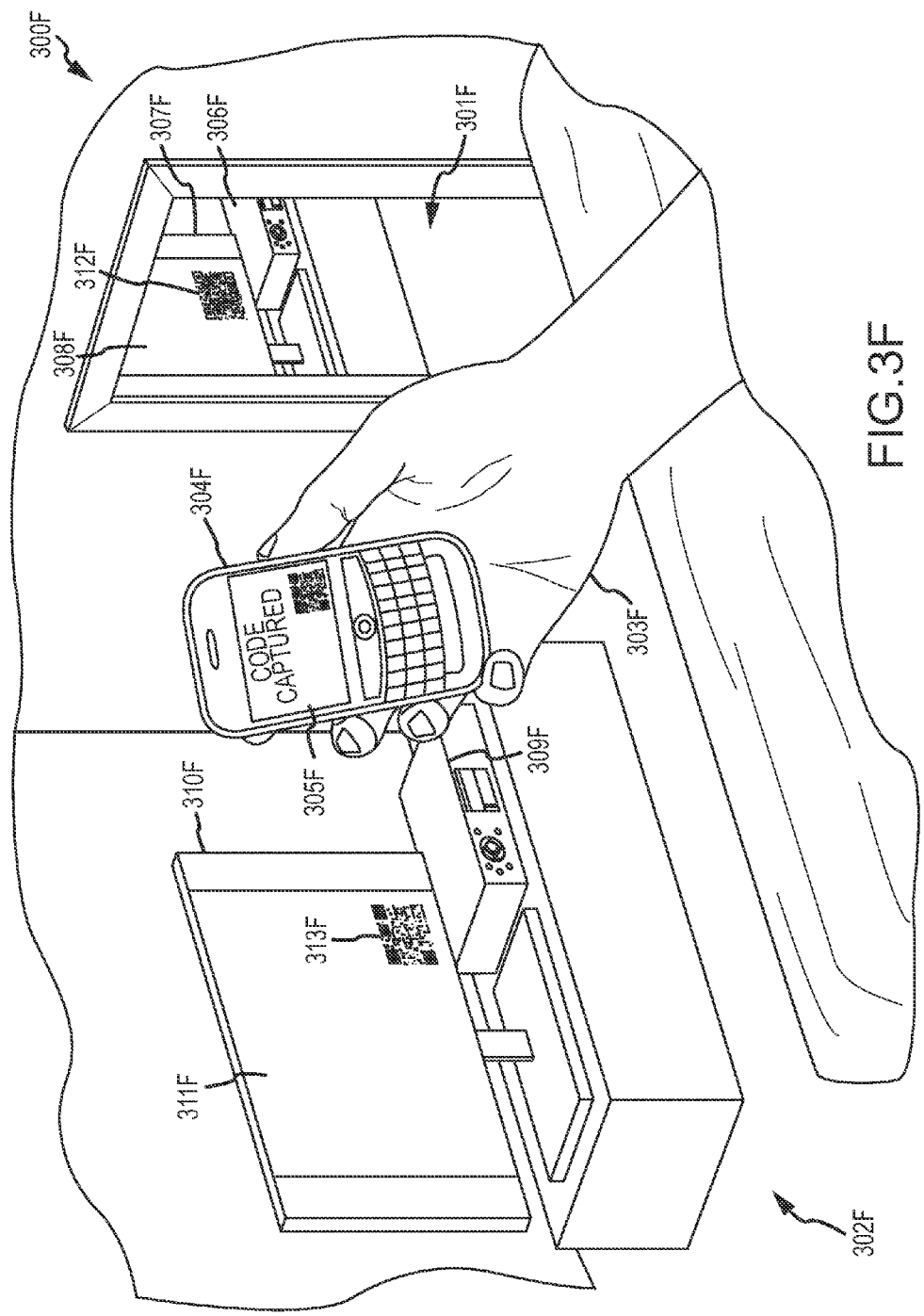

As illustrated in FIG. 3D, the user may then travel into their bedroom 302D and, as depicted in FIG. 3E, the set top box 309E may display a QR code 313E on a screen 3011E of the bedroom television 310E which the user 303E may capture utilizing the smart phone 304E. As illustrated in FIG. 3F, after the user 303F utilizes the smart phone 304F to capture the QR code 313F, the smart phone may display a message on the smart phone screen 305F that the QR code has been captured. Subsequently, the smart phone may transmit information from the captured matrix codes to a fraud detection computing device (not illustrated) operated by the content provider. As illustrated in FIG. 3G, if the fraud detection computing device determines that the set top boxes 306G and 309G are being utilized in the same location, the content provider may authorize the set top boxes and the smart phone 304G may display a confirmation to that effect (received from the content provider) on the smart phone screen 305G. Hence, the user 303G may then be able to utilize the set top boxes to receive content from the content provider.

Although FIGS. 3A-3G illustrate and describe the user 303A-303G utilizing the system 300A-300G to authorize the two set top boxes 306A-306G and 309A-309G during an initial installation process so that the two set top boxes can be utilized to receive content, this is merely for the purposes of example. In various implementations, the content provider may require the user to utilize the described process or similar processes to authorize the two set top boxes at times other than initial installation and may or may not require the user to perform such processes at an initial installation time. For example, in some cases the user may not be required to utilize the described process during an initial installation so that the two set top boxes can be utilized to receive content but may be required to utilize the described process at one or more times during utilization life of the two set top boxes (such as randomly, periodically, after the content provider suspects possible fraudulent use of the two set top boxes, and so on). In such cases if the user does not perform the described process and/or the content provider is unable to determine that the two set top boxes are not being fraudulently utilized, the content provider may prevent the two set top boxes from receiving content.

Figure 4:
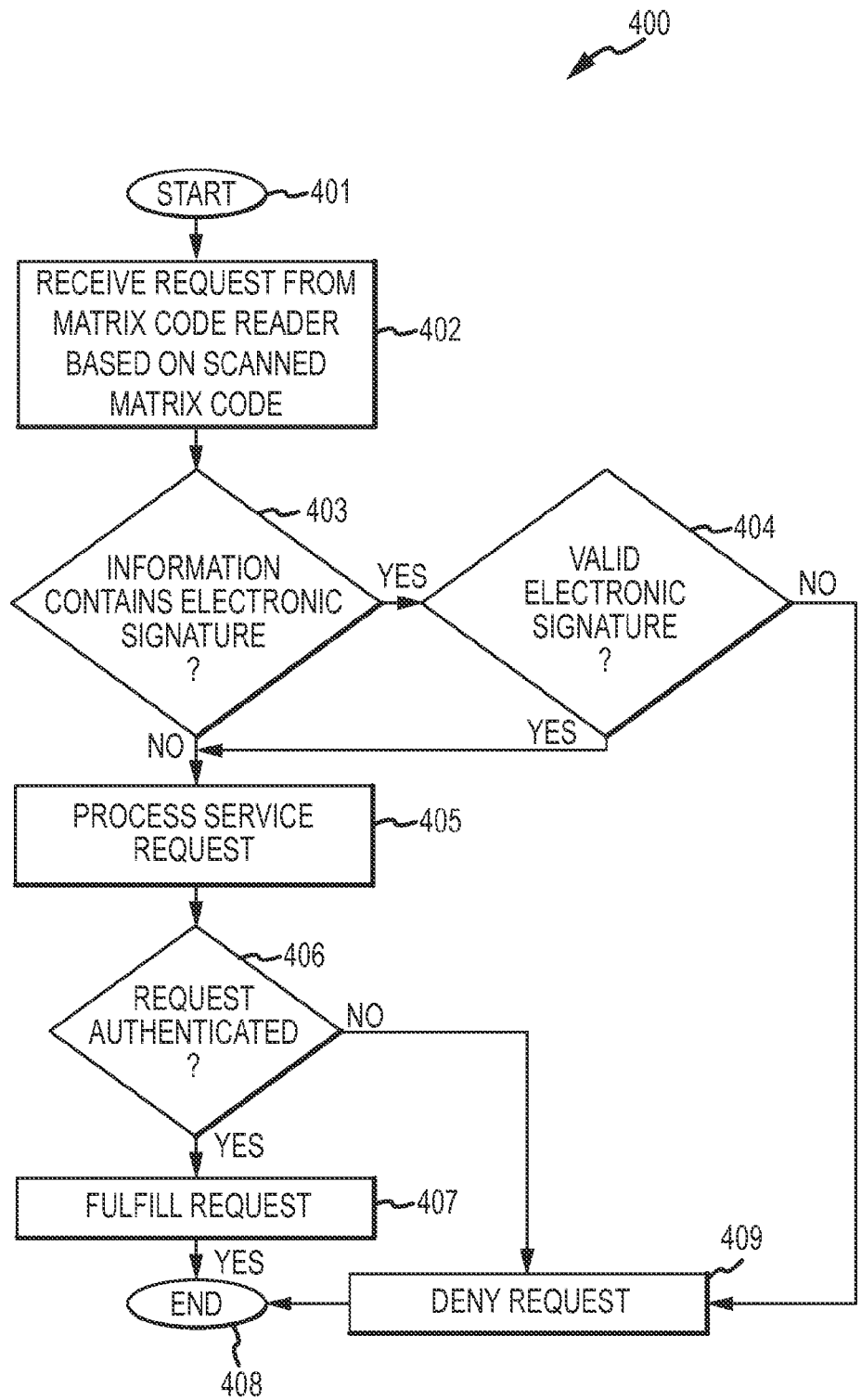
FIG. 4 is a flow chart illustrating a first example method for processing service requests submitted utilizing matrix codes. This method may be performed by the system of FIG. 1 and/or may be performed as part of the method of FIG. 2.

FIG. 4 illustrates a first example method 400 for processing service requests submitted utilizing matrix codes. The method 400 may be performed by a computing device such as the fraud determination computing device 101 of FIG. 1. In some implementations, the method 400 may be performed by the fraud determination computing device as part of performing the method 200 of FIG. 2. However, in various implementations the method 400 may be performed by the fraud determination computing device and/or one or more different computing devices separate from the method 200 of FIG. 2.

The flow begins at block 401 and proceeds to block 402 where the computing device receives a service request from a matrix code reader (such as the matrix code reader 102) based on a matrix code scanned by the matrix code reader (such as matrix codes output by the electronic devices 103a-103x and displayed by the display devices 104a-104x). The flow proceeds to block 403 where the computing device determines whether or not the request contains an electronic signature. If so, the flow proceeds to block 404. Otherwise, the flow proceeds to block 405.

At block 404, after the computing device determines that the service request includes an electronic signature, the computing device determines whether or not the electronic signature included in the service request is valid. If not, the flow proceeds to block 409 where the computing device denies the service request before the flow proceeds to block 408 and ends. Otherwise, the flow proceeds to block 405.

At block 405, the computing device begins processing the service request and the flow proceeds to block 406. At block 406, the computing device determines whether or not the request can be authenticated. If so, the flow proceeds to block 407 where the computing device fulfills the requests before the flow proceeds to block 408 and ends. Otherwise, the flow proceeds to block 409 where the computing device denies the service request before the flow proceeds to block 408 and ends.

Figure 5:
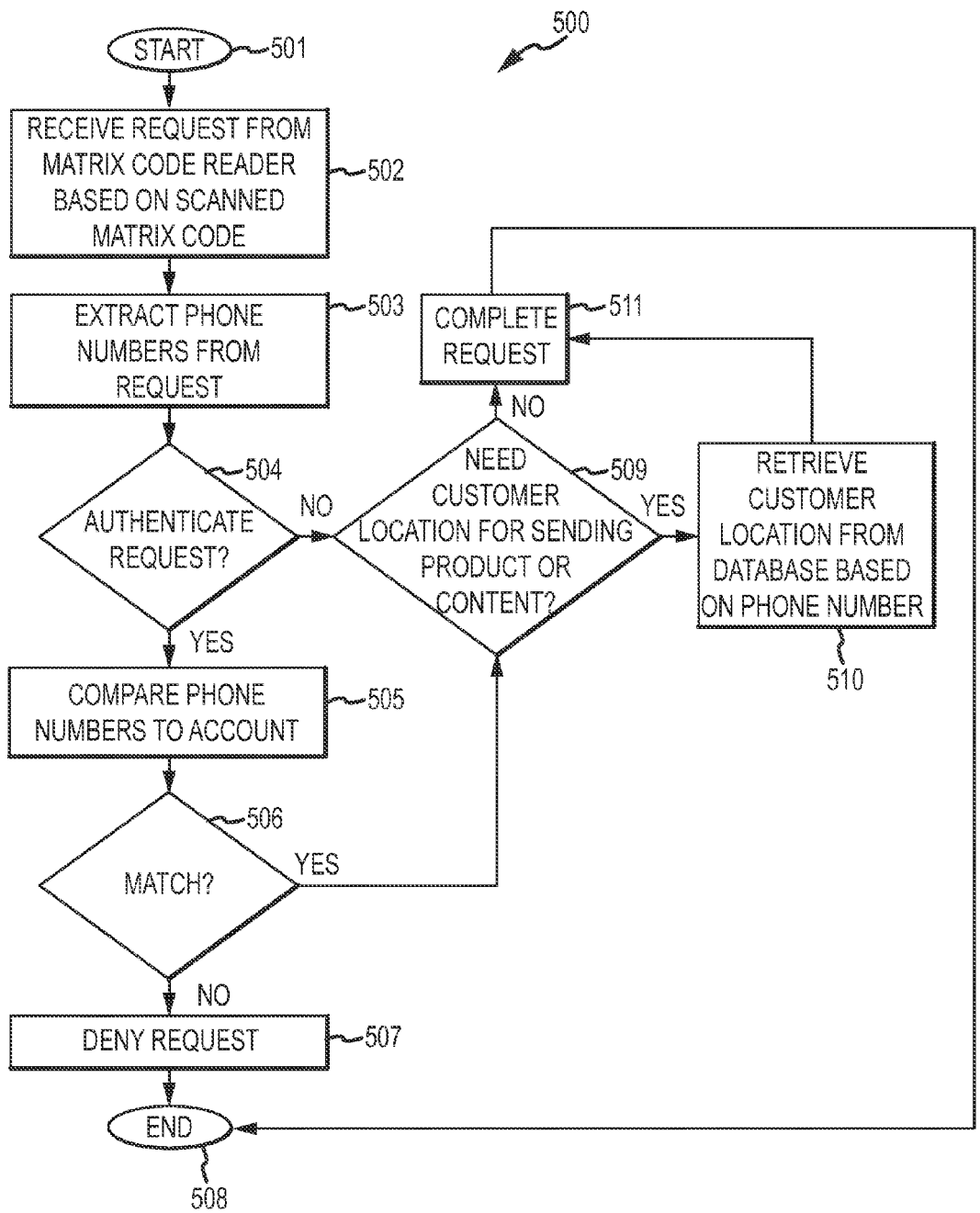
FIG. 5 is a flow chart illustrating a second example method for processing service requests submitted utilizing matrix codes. This method may be performed by the system of FIG. 1 and/or may be performed as part of the method of FIG. 2.

FIG. 5 illustrates a second example method 500 for processing service requests submitted utilizing matrix codes. The method 500 may be performed by a computing device such as the fraud determination computing device 101 of FIG. 1. In some implementations, the method 500 may be performed by the fraud determination computing device as part of performing the method 200 of FIG. 2. However, in various implementations the method 500 may be performed by the fraud determination computing device and/or one or more different computing devices separate from the method 200 of FIG. 2.

The flow begins at block 501 and proceeds to block 502 where the computing device receives a service request from a matrix code reader (such as the matrix code reader 102) based on a matrix code scanned by the matrix code reader (such as matrix codes output by the electronic devices 103a-103x and displayed by the display devices 104a-104x). The flow proceeds to block 503 where the computing device extracts one or more telephone numbers from the service request that were included by the matrix code reader. Next, the flow proceeds to block 504 where the computing device determines whether or not to authenticate the request. If so, the flow proceeds to block 505. Otherwise, the flow proceeds to block 509. In some implementations, the computing device may determine whether or not to authenticate the service request by comparing the type of request to a table stored by the computing device that contains one or more rules regarding types of service requests that require authentication and types of service requests that do not require authentication (such as rules specifying that service requests for ordering free on demand content do not require authentication whereas service requests for ordering pay on demand content require authentication).

At block 505, after the computing device determines to authenticate the service request, the computing device compares the extracted phone number to one or more phone numbers corresponding to one or more customer accounts associated with the service request. The flow then proceeds to block 506 where the computing device determines whether the extracted phone number matches the phone number corresponding to the customer account. If so, the flow proceeds to block 509. Otherwise, the flow proceeds to block 507 where the computing device denies the service request before the flow proceeds to block 508 and ends.

At block 509, after the computing device determines not to authenticate the service request or after the computing device authenticates the service request, the computing device determines whether information regarding a customer location is required to fulfill the service request in order to determine where to send one or more products and/or instances of content associated with the service request. If not, the flow proceeds to block 511 where the computing device completes one or more actions requested by the service request. Otherwise, the flow proceeds to block 510.

At block 510, after the computing device determines that information regarding a customer location is required to fulfill the service request in order to determine where to send one or more products and/or instances of content associated with the service request, the computing device retrieves the customer location information from a database of the computing device based on the extracted phone number. The flow then proceeds to block 511 where the computing device completes one or more actions requested by the service request utilizing the retrieved customer location.

For example, a user may scan a QR code (displayed on a television by a set top box) with a cellular telephone that prompts the cellular telephone to order a pay per view movie to the set top box from a pay per view provider and include the telephone number of the cellular telephone with the order. When the pay per view provider receives the order for the pay per view movie from the cellular telephone, the pay per view provider may extract the telephone number from the order and validate that the telephone number corresponds to the user's account. If so, the pay per view provider may retrieve a network address for the set top box associated with the user's account based on the phone number and may then transmit the pay per movie to the user's set top box utilizing the retrieved network address.

Figure 6:
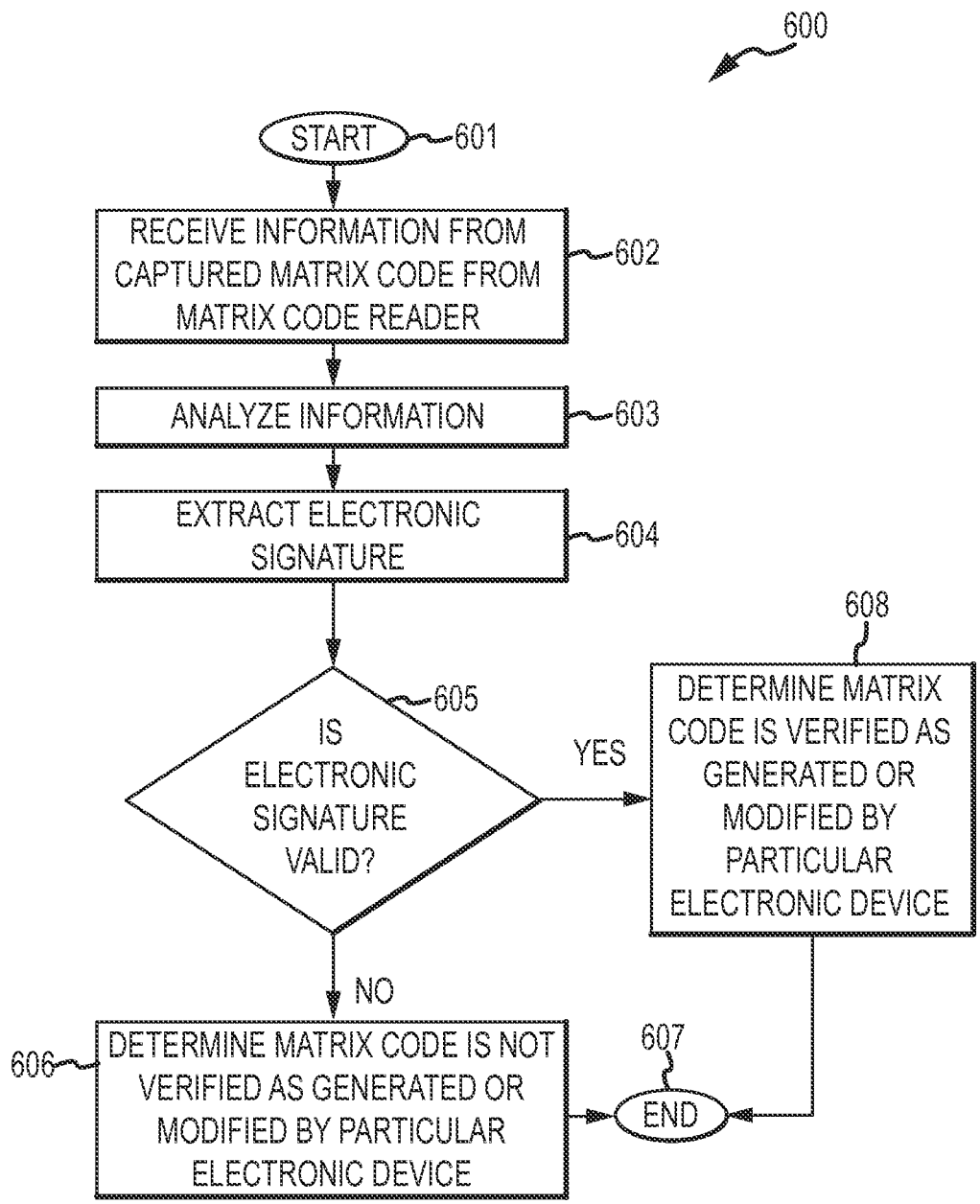
FIG. 6 is a flow chart illustrating a method for validating matrix codes. This method may be performed by the system of FIG. 1 and/or may be performed as part of the method of FIG. 2.

FIG. 6 illustrates a method 600 for validating matrix codes. The method 600 may be performed by a computing device such as the fraud determination computing device 101 of FIG. 1. In some implementations, the method 600 may be performed by the fraud determination computing device as part of performing the method 200 of FIG. 2. However, in various implementations the method 600 may be performed by the fraud determination computing device and/or one or more different computing devices separate from the method 200 of FIG. 2.

The flow begins at block 601 and proceeds to block 602 where the computing device receives information from a matrix code reader (such as the matrix code reader 102) based on a matrix code scanned by the matrix code reader (such as matrix codes output by the electronic devices 103a-103x and displayed by the display devices 104a-104x). In some implementations, the information may include information decoded from the matrix code. In other implementations, the information may be the matrix code itself. The flow proceeds to block 603 where the computing device analyzes the information. Next, the flow proceeds to block 604 where the computing device extracts an electronic signature from the information. Then, the flow proceeds to block 605 where the computing device determines whether or not the electronic signature is valid (i.e. generated by the electronic device that generated and/or modified the matrix code). If so, the flow proceeds to block 608. Otherwise, the flow proceeds to block 606.

For example, in various implementations, the electronic signature may be generated by the electronic device generating a hash value based on data included in the matrix code and then encrypting the hash value using an encryption key assigned to the electronic device. The encryption key may be the private key portion of a private-public encryption pair. In a private-public key pair encryption system, the holder of the private key may utilize the private key to encrypt messages that others may utilize the public key to decrypt and/or to decrypt messages that others have encrypted utilizing the public key. The encryption key may also be a one-way encryption key that is not part of a private-public encryption pair.

In implementations where the electronic device generated the electronic signature utilizing a private key assigned to the electronic device, the computing device may determine whether or not the electronic signature matches by generating the hash value, decrypting the electronic signature utilizing the public key corresponding to the private key assigned to the electronic device, and verifying that the hash value is the same as the decrypted value. In other implementations, where the electronic device generated the electronic signature utilizing a one-way encryption key that is not part of a private-public encryption pair, the computing device may determine whether or not the electronic signature matches by generating the hash value, encrypting the hash value utilizing the one-way key assigned to the electronic device, and determining whether the encrypted hash value is the same as the electronic signature.

At block 606, after the computing device determines that the electronic signature is not valid, the computing device determines that the matrix code is not verified as generated or modified by a particular specified electronic device. The flow then proceeds to block 607 and ends.

At block 608, after the computing device determines that the electronic signature is valid, the computing device determines that the matrix code is verified as generated or modified by the particular specified electronic device. The flow then proceeds to block 607 and ends.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for determining fraudulent use of electronic devices, the method comprising:
   receiving, utilizing at least one processing unit, information from at least one matrix code reader device that the at least one matrix code reader device obtained by scanning a plurality of matrix codes wherein each of the plurality of matrix codes was provided by one of a plurality of electronic devices;
   analyzing the information received from the at least one matrix code reader device utilizing the at least one processing unit; and
   determining, utilizing the at least one processing unit, whether the plurality of electronic devices are located in a same location based at least on said operation of analyzing the information.

2. The method of claim 1, wherein said operation of determining, utilizing the at least one processing unit, whether the plurality of electronic devices are located in a same location based at least on said operation of analyzing the information further comprises:
   comparing time differences between at least one of time stamps obtained from each of the plurality of matrix codes or times when each of the plurality of matrix codes was captured by the at least one matrix code reader device;
   determining the plurality of electronic devices are not located in the same location when the time differences exceed a time threshold.

3. The method of claim 1, wherein said operation of determining, utilizing the at least one processing unit, whether the plurality of electronic devices are located in a same location based at least on said operation of analyzing the information further comprises:
   comparing at least one matrix code reader telephone number associated with the at least matrix code reader and included in the information by the at least one matrix code reader to at least one account telephone number of at least one user account associated with the plurality of electronic devices; and
   determining the plurality of electronic devices are not located in the same location when the at least one matrix code reader telephone number is different from the at least one account telephone number.

4. The method of claim 1, wherein said operation of receiving, utilizing at least one processing unit, information from at least one matrix code reader device further comprises receiving a separate set of information for each of the plurality of matrix codes and said operation of determining, utilizing the at least one processing unit, whether the plurality of electronic devices are located in a same location based at least on said operation of analyzing the information further comprises:
   comparing matrix code reader telephone numbers associated with the at least matrix code reader and included in the separate sets of information for each of the plurality of matrix codes by the at least one matrix code reader; and
   determining the plurality of electronic devices are not located in the same location when any of the matrix code reader telephone numbers included in the separate sets of information for each of the plurality of matrix codes are different from each other.

5. The method of claim 1, wherein said operation of determining, utilizing the at least one processing unit, whether the plurality of electronic devices are located in a same location based at least on said operation of analyzing the information further comprises:
   verifying that each of the plurality of matrix codes was at least one of generated or modified by the respective one of the plurality of electronic devices; and
   determining the plurality of electronic devices are not located in the same location when at least one of the plurality of matrix codes is not verified as at least one of generated or modified by the respective one of the plurality of electronic devices.

6. The method of claim 5, wherein said operation of verifying that each of the plurality of matrix codes was at least one of generated or modified by the respective one of the plurality of electronic devices further comprises determining that each of the plurality of matrix codes includes an electronic signature.

7. The method of claim 6, wherein the electronic signature comprises a hash value of data included in the respective matrix code that is encrypted utilizing an encryption key assigned to the respective electronic device.

8. A system for determining fraudulent use of electronic devices, comprising:
   a plurality of electronic devices that each provide one of a plurality of matrix codes comprising:
      at least one electronic device processing unit that at least one of generates the respective one of the plurality of matrix codes or modifies the respective one of the plurality of matrix codes; and
      at least one output component that transmits the respective one of the plurality of matrix codes to at least one display device;
   at least one fraud determination computing device, comprising:
      at least one communication component that receives information from at least one matrix code reader device obtained by scanning the plurality of matrix codes; and
      at least one fraud determination computing device processing unit that analyzes the information and determines whether the plurality of electronic devices are located in a same location based at least on the analysis.

9. The system of claim 8, wherein the at least one fraud determination computing device processing unit verifies that each of the plurality of matrix codes was at least one of generated or modified by the respective one of the plurality of electronic devices and determines the plurality of electronic devices are not located in the same location when at least one of the plurality of matrix codes is not verified.

10. The system of claim 9, wherein the at least one fraud determination computing device processing unit verifies each of the plurality of matrix codes by determining that each of the plurality of matrix codes includes an electronic signature.

11. The system of claim 10, wherein the electronic signature is generated by the respective electronic device by creating a hash value of data included in the respective matrix code and encrypting the hash value utilizing an encryption key assigned to the respective electronic device.

12. The system of claim 8, wherein the at least one fraud determination computing device processing unit compares time differences between at least one of time stamps obtained from each of the plurality of matrix codes or times when each of the plurality of matrix codes was captured by the at least one matrix code reader device and the at least one fraud determination computing device processing unit determines the plurality of electronic devices are not located in the same location when the time differences exceed a time threshold.

13. The system of claim 8, wherein the at least one matrix code reader obtains at least one matrix code reader telephone number associated with the at least one matrix code reader and includes the at least one telephone number in the information, the at least one fraud determination computing device processing unit compares the at least one telephone number to at least one account telephone number of at least one user account associated with the plurality of electronic devices, and the at least one fraud determination computing device processing unit determines the plurality of electronic devices are not located in the same location when the at least one matrix code reader telephone number is different from the at least one account telephone number.

14. The system of claim 8, wherein the at least one matrix code reader obtains at least one matrix code reader telephone number associated with the at least one matrix code reader, the at least one communication component receives a separate set of information for each of the plurality of matrix codes from the at least one matrix code reader, the at least one matrix code reader includes the at least one matrix code reader telephone number in each of the separate sets of information, and the at least one fraud determination computing device processing unit compares the compares the at least one matrix code reader telephone number included in each of the separate sets of information and determines the plurality of electronic devices are not located in the same location when the at least one matrix code reader telephone number included in one of the separate sets of information is different than the at least one matrix code reader telephone number included in any other of the separate sets of information.

15. The system of claim 8, wherein the at least one communication component receives each of the plurality of matrix codes from the at least one matrix code reader device.

* * * * *